Patented Oct. 11, 1927.

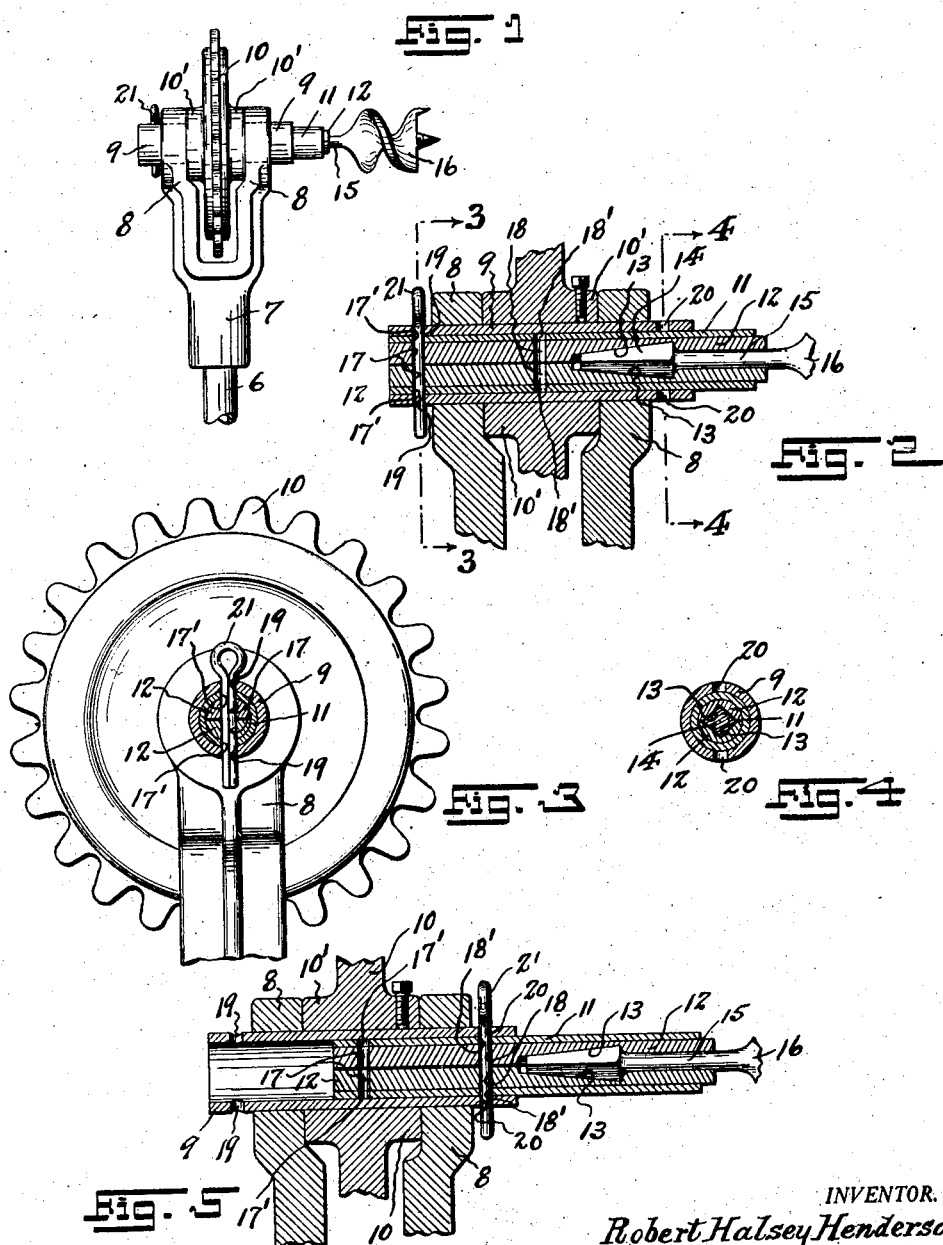

1,644,832

UNITED STATES PATENT OFFICE.

ROBERT HALSEY HENDERSON, OF EAST ORANGE, NEW JERSEY.

EXTENSIBLE CHUCK FOR BORING TOOLS.

Application filed September 16, 1925. Serial No. 56,611.

This invention relates, generally, to improvements in extensible tool holding chucks; and the invention has reference, more particularly, to an improved extensible rotary chuck for boring and similar tools, and especially for use in connection with joist boring machines.

This invention has for its principal object to provide for general use a simple and efficient rotary tool holding chuck, the length of which is subject to extension to thereby extend the reach of the tool operatively held thereby when necessary or desirable, without necessity for dismounting the chuck from or disturbing its rotatably driven relation to the supporting frame of an implement or machine of which it forms a part. In the more specific aspects of this invention, the same has for an object, to provide a simple and easily manipulated extensible tool holding chuck for operative assembly with the head of a joist boring machine, such, for example as that shown in my copending application Ser. No. 56,610, filed September 16, 1925, or as that shown in my prior Letters Patent No. 1,426,476, dated August 22nd, 1922.

Other objects of this invention, not at this time more particularly enumerated, will be clearly understood from the following detailed description of the same.

The invention is clearly illustrated in the accompanying drawings, in which—

Figure 1 is a side elevation of my novel extensible tool holding chuck as operatively mounted for rotation in connection with the head of an overhead joist boring machine; Figure 2 is a fragmentary longitudinal vertical section, showing the chuck in normal contracted condition, said view being drawn on an enlarged scale; Figure 3 is a transverse vertical section, taken on line 3—3 in Figure 2; Figure 4 is another transverse vertical section, taken on line 4—4 in said Figure 2; and Figure 5 is a longitudinal vertical section, similar to that shown in Figure 2, but illustrating the chuck in longitudinally extended condition.

Similar characters of reference are employed in all of the hereinabove described views, to indicate corresponding parts.

Referring now to said drawings, the reference character 6 indicates the vertical column or standard of a joist boring machine, to the upper end of which is secured a bifurcated head 7 adapted to provide a pair of spaced bearing arms 8. Journaled for rotation in and between said bearing arms 8 is the novel extensible tool holding chuck made according to and embodying the principles of this invention.

The novel extensible tool holding chuck comprises a hollow shaft 9 which is rotatably mounted in said bearing arms 8. Fixed on said hollow shaft 9, so as to be disposed between the spaced bearing arms 8, is a drive sprocket 10, which is retained against undue lateral play by the engagement of its hub portion 10' between said bearing arms 8. An endless link belt or drive chain (not shown) is adapted to run over said drive sprocket 10 to impart rotary motion thereto, and through the same to said hollow shaft 9. Telescopically fitted into the hollow shaft 9 is a longitudinally adjustable sleeve 11, which is preferably somewhat longer than the hollow shaft 9, so that the same projects beyond the forward end of the latter. Arranged within said adjustable sleeve is a split chuck-member 12, made in two semi-cylindrical longitudinal jaw sections, the inside or meeting faces of which are provided, at their forward end portions, with gripping sockets 13 adapted to conform to and embrace the butt 14 and stem 15 of a boring bit 16 which projects outwardly from the forward end of said split chuck-sleeve, thus gripping and holding the boring bit so that the rotary motion imparted to the chuck-sleeve is transmitted thereto.

Said split chuck-member is provided in its rearward portion with a plurality of transverse openings suitably spaced longitudinally apart, and comprising, at least, a set of rearward openings 17 and a set of forward openings 18; and in like manner said adjustable sleeve 11 is also provided with corresponding rearward openings 17' and forward openings 18' which match and aline themselves respectively with the rearward and forward openings 17 and 18 of said split chuck member, when the latter is inserted within said adjustable sleeve in operative assembled relation thereto.

Said hollow shaft 9 is provided in its rearwardly projecting end portion with transversely alined openings 19, and in its forwardly projecting end portion with transversely alined openings 20.

When the adjustable sleeve 11, split chuck-member, and boring bit 16 are assembled together, the same are inserted into the hollow shaft 9. When the chuck structure is to be disposed in normal contracted condition, the alined rearward openings 17 and 17' of the chuck member and sleeve 11 are alined with the rear end openings 19 of said hollow shaft 9, whereupon a coupling pin or key 21 is inserted through said alined openings 17, 17' and 19 (as shown in Figures 1 to 3 inclusive), which coupling pin or key 21 both secures the various elements in operative assembled relation against accidental separation or displacement, and at the same time so couples or interconnects the same together so that the rotary movement imparted to the hollow shaft 9 by the sprocket 10 is transmitted to the adjustable sleeve 11 and chuck-member whereby operative rotation of the boring bit 16 is attained. The contracted condition of the chuck structure thus produced presents the boring bit 16 at a comparatively short distance of projection, sufficient for boring holes of comparatively short depth or length.

If it is required to bore holes of comparatively long or greater depth, the boring bit 16 may be given a longer outward projection by adjusting the chuck structure to extended condition. This is accomplished by removing the coupling pin or key 21, and then sliding outwardly from the forward end of the hollow shaft 9 the assembled adjustable sleeve 11 and chuck member, until the forward openings 18 and 18' thereof are brought into alinement with the forward openings 20 of the hollow shaft 9, whereupon the coupling pin or key 21 is inserted through the alined openings 18, 18' and 20 (as shown in Figure 5), thus longitudinally projecting or extending the sleeve 11 from the forward end of the hollow shaft 9, and thereby increasing the reach of the boring bit 16. It will be obvious from an inspection of Figure 5 that a still further extension of the boring bit to obtain a maximum reach thereof may be produced by further sliding forward the sleeve 11 and associated chuck-member until the rearmost openings 17—17' of such parts are aligned with the forward openings 20 of the hollow shaft 9, and then inserting the coupling pin or key 21 therethrough.

From the above description it will be quite evident that a very simple, strong and easily manipulated extensible tool holding chuck is provided, which is adapted for use in various kinds and types of implements and machines, but which is especially applicable for use in connection with joist boring machines.

Having thus described my present invention, I claim:—

An extensible tool chuck, comprising a rotatable hollow shaft having transverse openings respectively disposed adjacent to its rearward and forward ends, a longitudinally adjustable sleeve slidable in said hollow shaft, a chuck member comprising separable semi-cylindrical jaw sections having gripping sockets in the meeting faces of their forward end portions to embrace and hold the butt of a tool element for operative forward longitudinal projection therefrom, said assembled jaw-sections being receivable in said adjustable sleeve whereby the same are retained in gripping relation to said tool element, both said jaw-sections and adjustable sleeve having longitudinally spaced sets of alined transverse openings in their rearward portions, the forward set being registrable at will with said forward transverse openings of said hollow shaft and the rearward set being selectively registrable with either the forward or rearward transverse openings of said hollow shaft, and a removable coupling pin engageable through selectively alined openings of said assembled sleeve and jaw sections and said hollow shaft as and for the purposes described.

In testimony, that I claim the invention set forth above I have hereunto set my hand this 12th day of September, 1925.

ROBERT HALSEY HENDERSON.